United States Patent [19] [11] Patent Number: 4,632,765
De Neef [45] Date of Patent: Dec. 30, 1986

[54] PROCEDURE FOR THE CONSOLIDATION OF SLUDGE

[76] Inventor: Dirk De Neef, Ferdinand Verbiestlaan 34, 2520 Edegem, Belgium

[21] Appl. No.: 765,149

[22] Filed: Aug. 13, 1985

[30] Foreign Application Priority Data

Oct. 25, 1984 [BE] Belgium ............... 2/60527

[51] Int. Cl.$^4$ ............................................. C02F 11/14
[52] U.S. Cl. ..................................... 210/717; 210/751
[58] Field of Search ............... 210/751, 609, 716, 717, 210/726–728, 732–736

[56] References Cited

U.S. PATENT DOCUMENTS

| 3,226,318 | 12/1965 | Schick | 210/751 X |
| 3,720,609 | 3/1973 | Smith et al. | 210/751 |
| 4,077,901 | 3/1978 | Arnold | 210/751 X |
| 4,118,354 | 10/1978 | Harada et al. | 210/751 X |
| 4,160,731 | 7/1979 | Doyle | 210/751 |
| 4,393,166 | 7/1983 | Reischl et al. | 210/751 X |

*Primary Examiner*—Tom Wyse
*Attorney, Agent, or Firm*—Bacon & Thomas

[57] ABSTRACT

Procedure for the consolidation of sludge, whereby this sludge is mixed with a small quantity of at least one calcium compound with a calcium oxide and/or calcium sulphate base, as well as with alkaline metal silicate and organic hardening agents in quantities sufficient to give the sludge durable and spadeable properties, with the characteristic that to the sludge containing a quantity of calcium compound an alkaline metal silicate and at least one non-phytotoxic organic hardening agent consisting of organic compounds containing more than 12 carbon atoms is added.

5 Claims, No Drawings

PROCEDURE FOR THE CONSOLIDATION OF SLUDGE

The invention is for a procedure for the consolidation of sludge and similar, in other words a method which serves to make a durable and spadeable whole from originally watery waste substances such as sludge, slurry, watery residues from industrial treatment plants and similar as well as from household waste or other solid substances which are first crushed and moistened, by the addition of chemical substances.

Other procedures are already known for the consolidation of sludge, which consist of the addition to the sludge of sodium or potassium silicate mixed with cement, which results in a spadeable mixture.

A drawback of the waste product resulting from this procedure is that phytotoxic substances contained in the cement and usually in the sludge as well will be leached out, so that the waste product obtained represents a danger to plant growth.

Another drawback of the waste product obtained by means of this known procedure is that poisonous elements in the consolidated sludge may be leached out, resulting in the poisoning of the subsoil and pollution of the groundwater, with all the harmful and even fatal consequences which this may bring about.

Similarly there are also procedures known for the consolidation of watery wastes in which moreover anorganic and/or organic hardening agents are used. The waste products obtained from this have the disadvantage of being phytotoxic, or in other words environmentally hazardous. The reason for this is that the anorganic hardeners contain heavy metals such as chrome and that the known organic hardeners are composed of compounds containing a maximum of twelve and usually less than eight carbon atoms.

The present invention consequently aims at an improved procedure for the consolidation of waste sludge by means of silicates, whereby this procedure does not exhibit the other drawbacks of the known procedures.

The main advantages of the procedure according to this invention relate to the environmental safety of the waste product obtained by the procedure, so that the number of applications and/or processing capabilities of these waste products are increased.

A first advantage of the invention is that the resulting waste product does not dewater and that therefore no toxic hazard can arise when it is used as a landfill.

A second advantage is that the water soluble components such as heavy metals, as well as other toxic elements, contained in the waste sludge are chemically and/or physically bonded and encapsulated in such a way that they cannot be leached out when they come into contact with water, so that the sludge could even be safely dumped at sea.

A further advantage, which arises directly from the foregoing, is that the resulting waste product can be used without undergoing further processing, and without any risk to the environment, in road construction, as landfill, as landfill cover, etc.

An incidental advantage is that the consolidated waste product can be reduced by means of a harrow to a porous aggregate condition, after which, as all potentially phytotoxic elements are fixed in the structure of the material, can be directly seeded with for example various grass sorts and planted with all types of crops.

The aforementioned advantages are according to the invention achieved by applying a procedure for the consolidation of the sludge, whereby this sludge, which may or may not have been neutralized aforehand, is mixed with a small quantity of at least one calcium compound such as a calcium oxide compound, for example a cement, or a calcium sulphate compound, for example gypsum, alabaster and anhydride—if this calcium compound was not already present in the sludge—as well as with alkaline metal silicate and organic hardening agents in quantities sufficient to give the sludge durable and spadeable properties, with the characteristic that to the sludge containing a quantity of calcium compound, an alkaline metal silicate or a low toxicity mixture of sodium silicate and potassium silicate is added and at least one non-phytotoxic organic hardening agent consisting of organic compounds containing more than 12 carbon atoms.

With a view to better illustrating the characteristics of the invention a preferred procedure for the consolidation of sludge in accordance with the invention is described by way of example below but without having any exhaustive character.

The sludge or similar is if necessary mixed with small quantities of cement, gypsum, or other calcium salts. Depending on the nature of the sludge it is possible that these substances are already present in the sludge.

In doing this in accordance with a known procedure a basic product is added consisting of an alkaline metal silicate, such as sodium silicate. As, however, high sodium concentrations are highly phytotoxic, the preferred method will depending on the individual case be to work with a mixture of sodium and potassium silicate, as this is much less phytotoxic.

The mixture thus obtained forms a non-water-soluble calcium silicate which is precipitated thus bonding the solid elements of the waste, while the water is chemically fixed in the structure by means of an exothermic reaction.

As the sludge cannot withstand leaching a hardener must also be added. Pursuant to the procedure of this invention for this reason at least one compound or simple cross-linking hardener is added to the sludge, which consists of organic components containing more than twelve carbon atoms, and which consequently is not phytotoxic.

While not being exhaustive, and solely by way of example, a number of hardeners are listed here: polyvinyl alcohol, ureaformaldehyde mixed with proteins, polyacrylamide mixed with glyoxal, etc.

This invention is by no means limited to the procedure described in the example, but this procedure for the consolidation of sludge can be applied in many modified forms without going beyond the scope of this invention.

Thus it will be clear that substances to be added pursuant to the invention, whether a calcium compound as defined above, or an alkaline metal silicate, or an organic hardener, can be used in quantities which can vary within very wide limits. The essential object is to use quantities and proportions which give a durable and spadeable waste product. The specialist can by carrying out a number of simple experimental comparisons find the optimal proportion. The quantity of calcium salts which must be added will generally vary from 0 to 100% of the mass of the material being treated, depending on the form in which the calcium is added, and of the nature of the material to be treated. There is no fixed relationship of this quantity to the other additives, which can only be determined experimentally.

The metal silicate and the hardener are usually mixed in a proportion of 10 to 1, but this ratio can depending on the application also be used in other proportions. The quantities of metal silicates will generally be 2 to 30% of the mass of the material to be treated, depending on the nature, and the quality of the sludge or similar.

It is thus also clear that the waste product in its original form does not necessarily have to be a sludge or similar. The waste product can be household waste or a solid waste which must first be crushed and possibly moistened, after which it can be mixed with for example an aqueous solution of alkaline metal silicate. The original waste product, which could for example be toxic, can then be encapsulated in accordance with the procedure pursuant to the invention.

I claim:

1. A process for hardening and rendering sludge non-phytotoxic which comprises mixing the sludge with an alkali metal silicate, a calcium compound if one is not already inherently present, and a non-phytotoxic organic compound hardener having more than 12 carbon atoms; said calcium compound being selected to form an insoluble calcium silicate and said ingredients added in sufficient quantities to form a spadeable and durable composition whereby said alkali metal silicate and calcium compound react to form an insoluble calcium silicate precipitate therein which, together with the organic hardener renders the sludge hardened and non-phytotoxic.

2. The process of claim 1 wherein the calcium compound is calcium oxide or calcium sulfate and the alkali silicate is a mixture of sodium and potassium silicate.

3. The process of claim 1 wherein the non-phytotoxic organic hardening agent is polyvinylalcohol.

4. The process of claim 1 wherein the non-phytotoxic organic hardener is ureaformaldehyde mixed with protein.

5. The process of claim 1 wherein the non-phytotoxic organic hardening agent is polyacrylamide mixed with glyoxal.

* * * * *